(12) United States Patent
Wang et al.

(10) Patent No.: US 9,293,777 B2
(45) Date of Patent: Mar. 22, 2016

(54) BATTERY ELECTROLYTE SUSPENSION

(71) Applicants: Yan Wang, Shrewsbury, MA (US);
Diran Apelian, West Boylston, MA (US); Yang Bai, Worcester, MA (US);
Wenhuan Li, Worcester, MA (US)

(72) Inventors: Yan Wang, Shrewsbury, MA (US);
Diran Apelian, West Boylston, MA (US); Yang Bai, Worcester, MA (US);
Wenhuan Li, Worcester, MA (US)

(73) Assignee: Worcester Polytechnic Institute, Worcester, MA (US)

( * ) Notice: Subject to any disclaimer, the term of this patent is extended or adjusted under 35 U.S.C. 154(b) by 238 days.

(21) Appl. No.: 13/892,478

(22) Filed: May 13, 2013

(65) Prior Publication Data

US 2013/0323611 A1 Dec. 5, 2013

Related U.S. Application Data

(60) Provisional application No. 61/646,496, filed on May 14, 2012.

(51) Int. Cl.
| | |
|---|---|
| *H01M 8/06* | (2006.01) |
| *H01M 8/04* | (2006.01) |
| *H01M 8/18* | (2006.01) |
| *H01M 8/22* | (2006.01) |

(52) U.S. Cl.
CPC ...... *H01M 8/04798* (2013.01); *H01M 8/04276* (2013.01); *H01M 8/188* (2013.01); *H01M 8/225* (2013.01); *Y02E 60/528* (2013.01)

(58) Field of Classification Search
CPC ............ H01M 8/04798; H01M 8/04276; H01M 8/188; H01M 8/225; Y02E 60/528
See application file for complete search history.

(56) References Cited

U.S. PATENT DOCUMENTS

| | | | | |
|---|---|---|---|---|
| 8,889,300 | B2 * | 11/2014 | Bugga et al. | 429/231.95 |
| 2001/0028977 | A1 * | 10/2001 | Kazacos et al. | 429/105 |
| 2012/0282508 | A1 * | 11/2012 | Bendert | 429/101 |

* cited by examiner

*Primary Examiner* — Raymond Alejandro
(74) *Attorney, Agent, or Firm* — Chapin IP Law, LLC

(57) ABSTRACT

A flow battery employs a solid suspension charge material to maintain high charge density via stability of a suspension including a binder, conductive carbon and an electrolyte. A cathodic suspension employs carbon powder as a stabilizing agent in a suspension form to avoid precipitation of solids and maintain a high surface area of the suspended solids. The stabilizing agent undergoes agitation and milling to reduce a particle size and increase the change density due to the conductive nature of the fine powdered stabilizing agent exhibiting high energy density. The resulting suspensions are circulated in a charge cell connected to a load for providing electrical power.

12 Claims, 5 Drawing Sheets

BATTERY ELECTROLYTE SUSPENSION

RELATED APPLICATIONS

This patent application claims the benefit under 35 U.S.C. §119(e) of U.S. Provisional Patent App. No. 61/646,496, filed May 14, 2012, entitled "HIGH ENERGY DENSITY FLOW BATTERIES," incorporated herein by reference in entirety.

BACKGROUND

Flow batteries circulate charge material in the form of a liquid electrolyte for reacting the charge material in a cell to generate electricity from an electrochemical reaction between anode and cathode charge materials. Flow batteries, in contrast to conventional sealed cells such as commonly employed in automobiles, portable electronics, and flashlights, separate the charge materials from an ionic transfer cell or containment where electrochemical reactions occur. Flow batteries decouple power and energy because the charge material is maintained separately and may be stored as an arbitrary volume, in contrast to conventional sealed cells which have a fixed quantity of charge material. Therefore, the charge volume, or capacity, is independent from the energy density, or delivery rate of electrical energy (current and voltage) being drawn of the battery.

SUMMARY

A solid suspension charge material for a flow battery maintains high charge density via stability of a suspension including a binder, conductive carbon and an electrolyte. In the example arrangement, zinc oxide (ZnO) is employed as the anodic (anode) charge material and nickel hydroxide (Ni(OH)$_2$) is employed as the cathodic (cathode) charge material, and form respective anodic and cathodic suspensions using carbon powder and additives to form suspensions having high stability and high energy density. The resulting suspensions are circulated in a charge cell connected to a load for providing electrical power.

Conventional approaches to flow battery usage employ electrolyte solutions circulated through a charge cell for producing an electrochemical reaction and corresponding electrical generation via ion transfer. Unfortunately, conventional approaches suffer from the shortcoming that the charge density of the conventional electrolyte solutions tend to be relatively weak per unit volume of electrolyte. Such electrolyte solutions tend to become saturated and precipitate out, limiting the quantity of charge material that may be dissolved. Therefore, large volumes of electrolyte solution must be employed and circulated to generate a useful energy component in the form of electric charge. Accordingly, configurations herein substantially overcome the shortcomings of conventional solution based flow batteries by introducing a charge suspension having a high charge density for generating substantial electrical energy from a relatively manageable volume of charge material via anodic (anode) and cathodic (cathode) suspensions.

Flow batteries are used for large-scale applications that require high-capacity storage and also high power storage. However, they have low power density (~40 mA/cm$^2$) and energy density (~30 Wh/L) because of the solubility limit of active materials in solution, which prevents widespread use.

In a particular configuration disclosed below, a nickel/zinc (Ni/Zn) flow battery includes an anodic charge material and a cathodic charge material, such that the anodic charge material is different than the cathode charge material and the anodic and cathodic charge materials are defined by a suspension including a conductive carbon powder and additives for stabilizing the suspension. In the example arrangement, the anodic charge material is zinc oxide (ZnO) and the cathode charge material is nickel hydroxide (Ni(OH)$_2$), however alternate charge materials may be employed.

The anodic and cathodic charge material are prepared using a mixer for a predetermined time and adding carbon powder and other stabilizing agents for stabilizing the suspension and avoiding settling, in which the charge materials are responsive to the carbon powder for forming a solid suspension network having high energy density properties. The anodic and cathodic charge materials are then supplied to a flow battery for distributing the charge materials through a voltage cell, such that the voltage cell has positive and negative terminals for connection to a load, in which the anodic and cathodic charge materials are circulated via a respective pump for maintaining a potential in the voltage cell for powering the load.

Configurations herein substantially overcome the above described shortcomings of conventional solution-based flow batteries by providing a flow battery with Ni/Zn chemistry. The configurations disclosed below present Ni/Zn flow batteries that approximate the following characteristics: Energy density: 260 Wh/L, Power density: 100 mW/cm$^2$, cycle life: 5000 cycles, cost: $100/kW and further promote a high safety factor due to the involatility of the water based electrolyte suspension.

In the configurations disclosed below, a method of generating an electrochemical charge is disclosed which includes combining a cathode material with an electrolyte and a stabilizing agent to form an electrolyte mixture, and generating a suspension by agitating the electrolyte mixture. A similar suspension is generated for the anode side. The charge material suspensions are circulated the suspension through a voltage cell having charge plates responsive to the electrolyte mixture for generating the electrochemical charge. To prepare a proper suspension for the charge material, combining the cathode material further includes adding a stabilizing agent to a water base, and adding an electrolyte based on the suspension properties of the electrolyte and the stabilizing agent in the water base. Following mixture and agitation, the cathode material is added to form a suspension, and the suspension further agitated decreasing a particle size of the suspension and increasing a charge density of the suspension. Preparation of the anode material involves similar steps.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Flow batteries are generally applicable to large-scale projects that require high-capacity storage and also high power storage. However, conventional flow batteries have low power density, being on the order of (~40 mA/cm$^2$) and having an energy density around ~30 Wh/L because of the solubility limit of active materials in solution, which presents obstacles to common usage of conventional flow batteries. In the examples disclosed below, a flow battery employs charge material in the form of separate volumes of anode and cathode material circulated through a voltage cell for drawing electrical energy from electrodes attached to the voltage cell.

In the approach disclosed below, the active materials for the anode and cathode in Ni/Zn batteries are ZnO and Ni(OH)$_2$, respectively. For the anode, carbon powder is added to form the electrical network to increase the electronic conductivity of the electrode. For the cathode, Ni(OH)$_2$ powder coated with cobalt oxide hydroxide (CoOOH) is used since CoOOH has higher electronic conductivity. Carbon is added in the cathode to form the electric network to further increase the electronic conductivity. The mixtures are added into 6 mol/L potassium hydroxide (KOH) solution (electrolyte for Ni/Zn battery) with different additives to prepare the suspension. The resulting suspensions will be stirred for 10 hours prior to use. Our results showed that suspension can be successfully fabricated. In order to increase the stability of the suspension, several methods including reducing particle size by ball milling, adding effective dispersants (for example poly (acrylic acid) or polyethylene glycol), such that surface modification is utilized. The disclosed approach combines the advantages of high energy density suspension and Ni/Zn chemistry and offers a distinguishable design of flow batteries with high energy and power densities and low cost.

Figure 1:
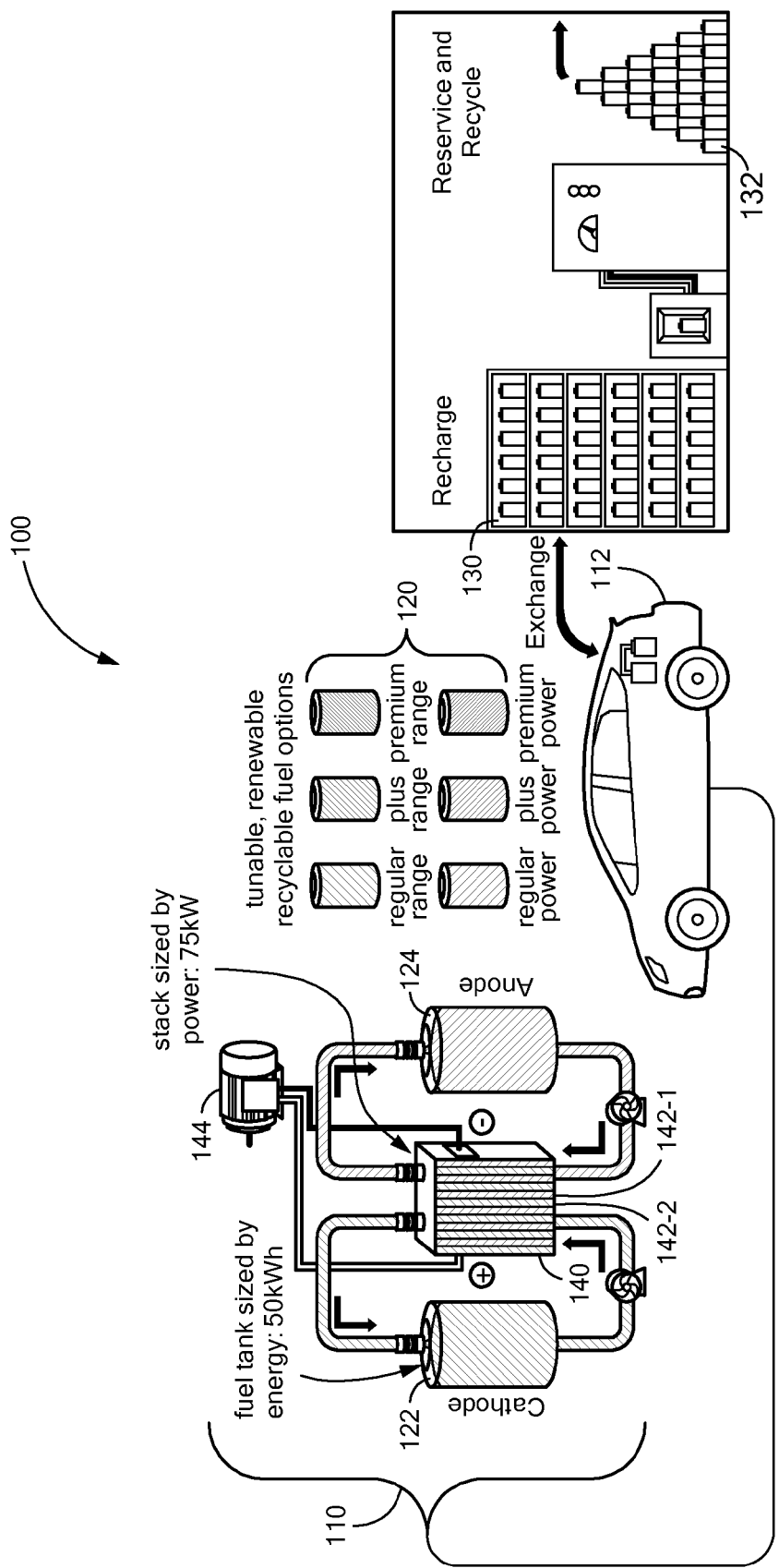
FIG. 1 is a context diagram of an environment suitable for use with configurations herein.

FIG. 1 is a context diagram of an environment suitable for use with configurations herein. Referring to FIG. 1, in a managed energy environment 100, a high-density flow battery 110 (flow battery) as disclosed herein may be employed in an electric or hybrid vehicle 112, for example. The charge material 120, including the cathode material 122 and anode material 124 take the form of a suspension that can be tuned for range or power delivery. Options for delivery of the charge material 120 to customers could then take a range of forms similar to the manner that petroleum based fuels are rated in octane. The charge material 120 could also be recharged at a charging facility or device 130, and eventually reserviced, refurbished or recycled at a recycling facility 132.

In the flow battery 110, such as a flow battery disposed in the vehicle 112, power delivery can be tuned, or sized to correspond to the needs of the vehicle by the arrangement of charge plates 142-1 (anode) and 142-2 (cathode), 142 generally, inside a voltage cell 140. Electrochemical reactions, typically ionic transfers, occur within the voltage cell 140 for generating a voltage for powering a load, such as an electric motor 144. Power delivery is increased by increasing the area of the charge plates 142, and charge capacity is increased by additional volumes of the charge material 120 suspension. Qualitative differences in the suspension, such as an amount of suspended charge material per unit volume, affect the total charge capacity, or stored electrical energy.

Figure 2:
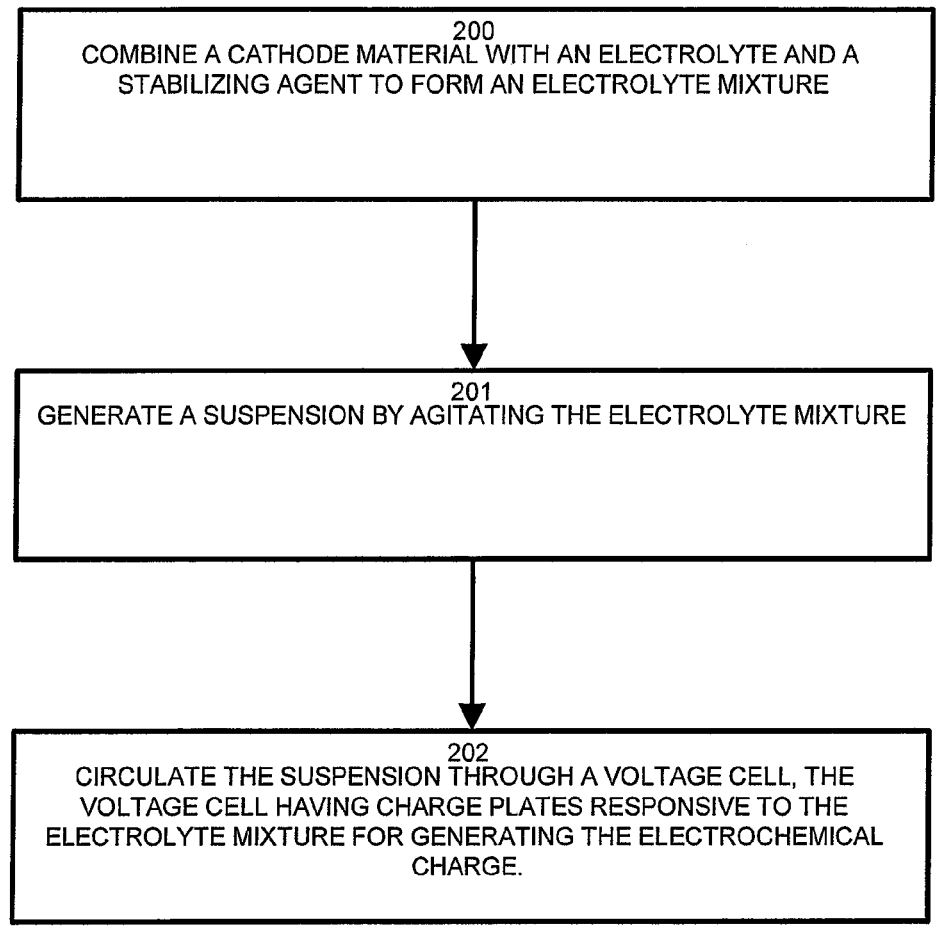
FIG. 2 is a flowchart of charge generation in the environment of FIG. 1.

FIG. 2 is a flowchart of charge generation in the environment of FIG. 1. Referring to FIGS. 1 and 2, in a particular configuration, the flow battery 110 performs a method of generating an electrochemical charge by combining a cathode material with an electrolyte and a stabilizing agent to form an electrolyte mixture, such as the cathode material (mixture) 122, and the anode material (mixture) 124, as disclosed at step 200, and generates a suspension by agitating the electrolyte mixture. The stabilizing agent, discussed further below, facilitates formation of a suspension having a greater charge density than a conventional solution, which are prone to precipitate out charge materials when the concentration becomes too high. The flow battery 110 circulates the suspension through a voltage cell 140, in which that the voltage cell 140 has charge plates 142 responsive to the electrolyte mixture for generating the electrochemical charge, as depicted at step 202.

In a particular configuration, disclosed herein, there is an electrolyte suspension mixture for both the anode material 124 and the cathode material 122, corresponding to the anode and cathode poles (electrodes) of the voltage cell 140. Suspension properties disclosed herein are generally applicable to both, however the examples below will illustrate particular aspects of handling the individual suspensions. In particular, the cathode material suspension 122 requires a more delicate process for maintaining an effective high-density suspension.

Figure 3:
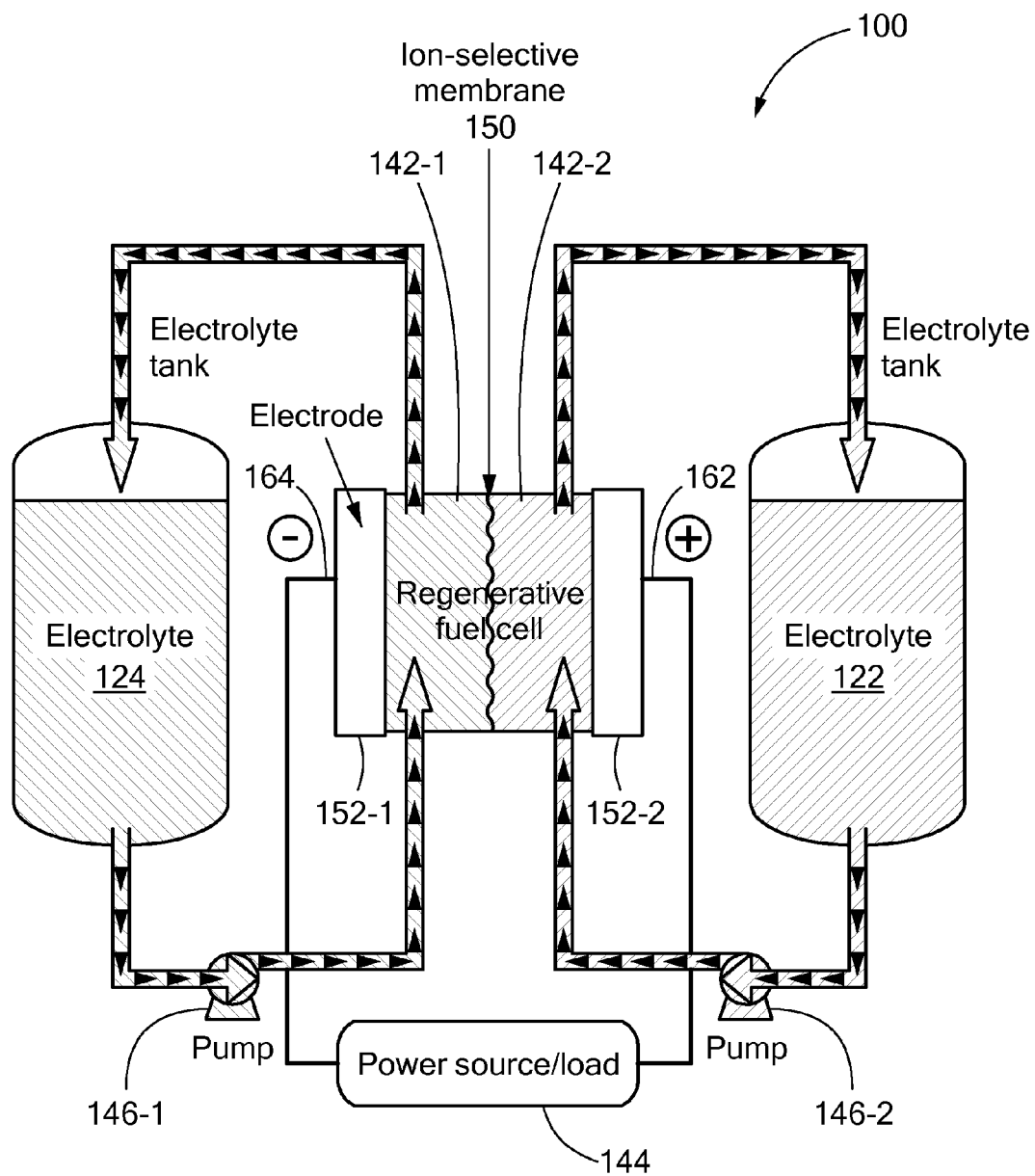
FIG. 3 is a diagram of a flow battery in the environment of FIG. 1.

FIG. 3 is a diagram of a flow battery in the environment of FIG. 1. Referring to FIGS. 1 and 3, the charge cell 110 circulates the charge material 120 via pumps 146-1, 146-2 (146 generally) to maintain the anode material 124 and cathode material 122 in the voltage cell 140. The voltage cell 140 has a separator 150, such as an ion selective membrane, for allowing ionic transfer between the cathode material 122 and anode material 124. The ion transfer causes a complementary electron (electrical) flow from the electrodes 152-1, 152-2 (152 generally) for powering the load 144 as the electrodes exhibit a voltage at terminals 162 (positive) and 164 (negative). As indicated above, the power (volts and amps) available from the voltage cell 140 is driven by the size and number of charge plates 142 for scaling the ion transfer, while the energy available is driven by the volume of charge material, thus decoupling power from energy.

Figure 4:
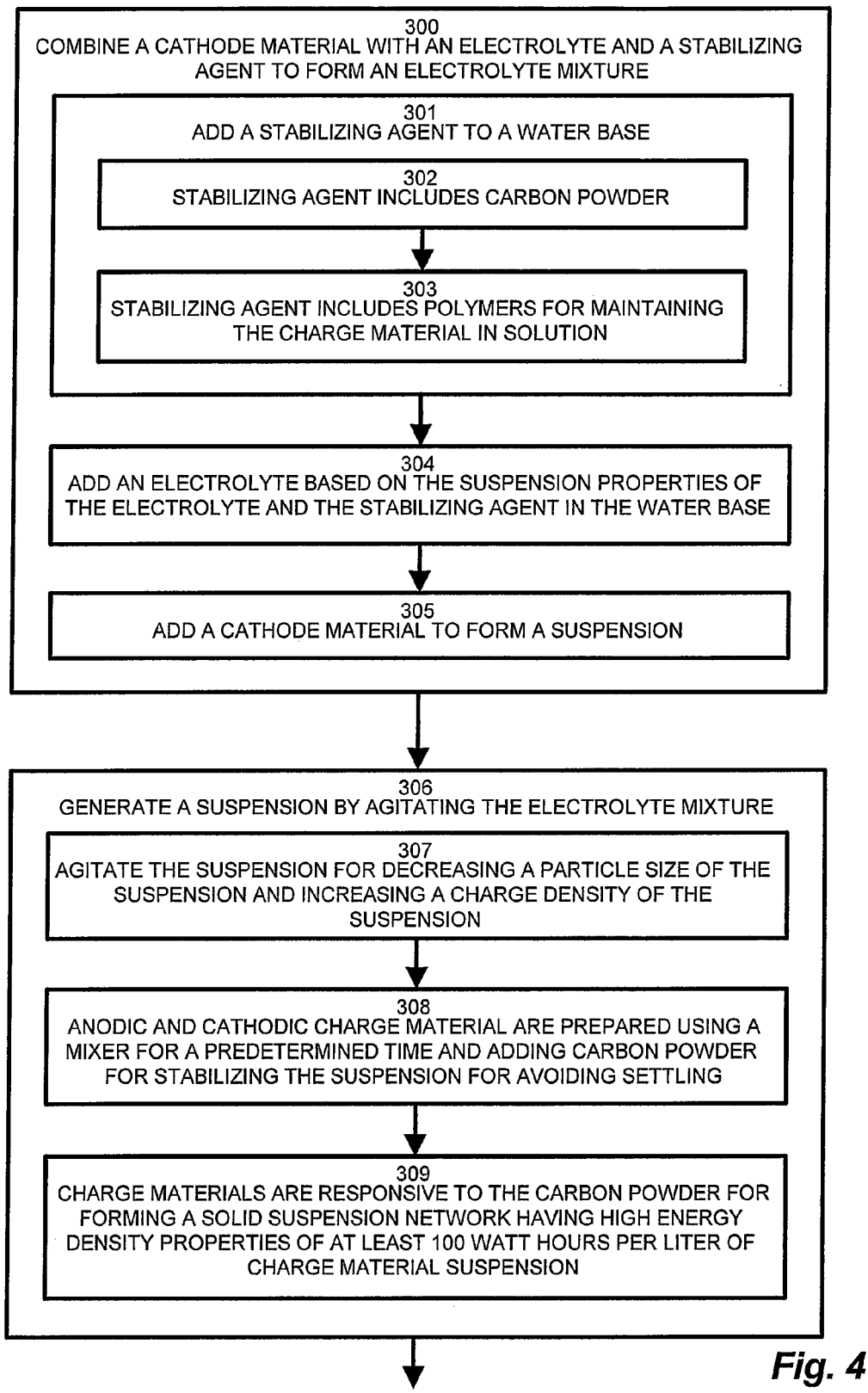
FIGS. 4-5 are a flowchart of charge material suspension development in the flow battery of FIG. 3.
Figure 5:
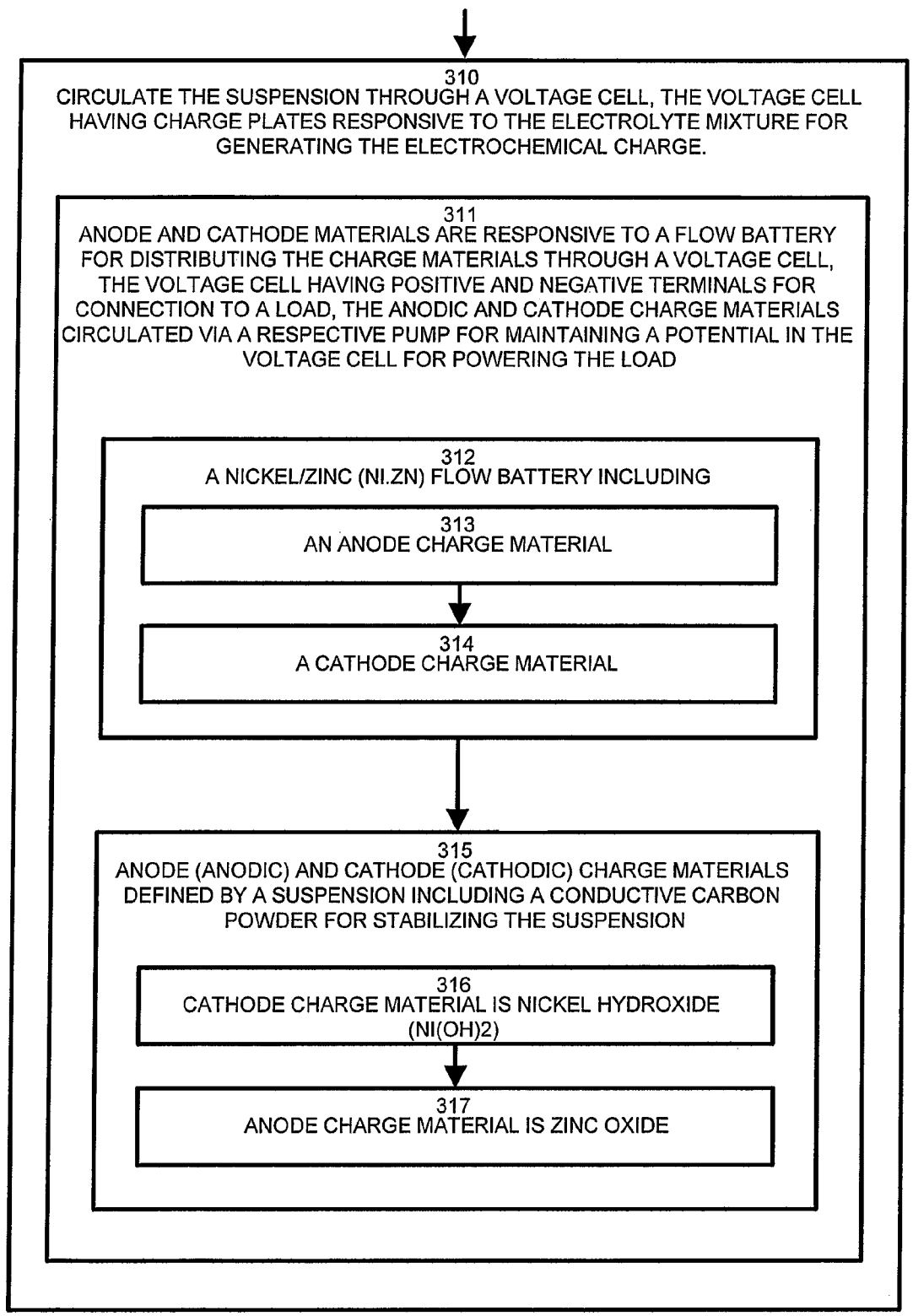

FIGS. 4-5 are a flowchart of charge material suspension development in the flow battery of FIG. 3. Referring to FIGS. 3-5, the method of generating an electrochemical charge as disclosed in FIG. 2 further includes combining the cathode material 122 with an electrolyte and a stabilizing agent to form an electrolyte mixture, as begun at step 300. Combining further includes adding a stabilizing agent to a water base, as disclosed at step 301. In an example configuration, the stabilizing agent includes carbon powder, however other suitable additives may be employed. For example, the stabilizing agent may include polymers for maintaining the charge material in solution, as depicted at step 303, so as to achieve a greater density (concentration) of the suspended cathode material.

In the particular example shown, the cathode material is Nickel Hydroxide (Ni(OH)$_2$) and the anode material is Zinc Oxide (ZnO), however other battery chemistries may benefit from the high-density suspension disclosed herein. The method then adds an electrolyte based on the suspension properties of the electrolyte and the stabilizing agent in the water base, as depicted at step 304. Suspension density properties benefit from the addition of the carbon powder to the water first, then adding electrolyte followed by the charge material. Accordingly, step 305 provides for adding a cathode material to result in a mixture adapted to form a suspension. The method combines the stabilizing agent with the electrolyte, agitating the combination before adding the cathode material, adding the cathode material and further agitating the mixture including the added cathode material for increasing the charge density. The resulting the suspension has a concentration greater than 2 moles/liter of the cathode material. Thus, generation of the cathode material suspension includes combining the cathode material with a water based electrolyte, and agitating the combination with a stabilizing agent, such that the stabilizing agent is for increasing the charge density of the suspended charge material. Similar steps apply for generating an anode suspension by combining an anode material with the stabilizing agent.

Accordingly, configurations herein generate a suspension by agitating the electrolyte mixture, as shown at step 306, thus agitating the suspension for decreasing a particle size of the suspension and increasing a charge density of the suspension, as clarified at step 307. The cathode materials 122 and anode materials 124 undergo various preparations for increasing a surface area of the materials for increasing density, and enhancing the ability of the electrolyte to maintain the charge material in suspension. Accordingly, agitation further include ball milling to increase granularity of the suspension. In the example configuration, the anodic and cathodic charge materials are prepared using a mixer for a predetermined time and adding carbon powder for stabilizing the suspension for avoiding settling, as depicted at step 308, such that in the example configuration, the charge materials are responsive to the carbon powder for forming a solid suspension network having high energy density properties of at least 100 watt hours per liter of charge material suspension, as disclosed at step 309.

Following preparation of the cathode 122 and anode 124 material, the pump 146 circulates the suspension through the voltage cell 140, in which the voltage cell 140 has charge plates 142 responsive to the electrolyte mixture for generating the electrochemical charge, as depicted at step 310. In the example structure of the flow battery 110 shown, the anode materials 124 and cathode materials 122 are responsive to the flow battery 110 for distributing the charge materials through the voltage cell 140, such that the voltage cell has positive 162 and negative terminals 164 for connection to a load 144, in which the anodic 124 and cathode charge materials 122 are circulated via a respective pump 146 for maintaining a potential in the voltage cell 140 for powering the load 144, as shown at step 311.

In the example battery chemistry shown, the flow battery 110 circulates the suspension through a nickel/zinc (Ni/Zn) flow battery, as shown at step 312, such that the flow battery 110 includes an anode charge material, as depicted at step 313, and a cathode charge material, as shown at step 314, such that the anode (anodic) 124 and cathode (cathodic) 122 charge materials are defined by a suspension including a conductive carbon powder for stabilizing the suspension, as disclosed at step 315. In the example shown, the cathode charge material 122 includes nickel hydroxide (Ni(OH)$_2$), as shown at step 316, and the anode charge material 124 is zinc oxide ZnO, as depicted at step 317. However, as indicated above, other battery chemistries may be employed by preparing the charge material suspension for high density, as discussed above.

The above description discloses an example configuration and method for generating and using a high density charge material suspension in a flow battery 140. While various permutations and combinations of preparing the charge material suspension may be attempted within the scope of the disclosure above, one particular approach to building the flow battery 110 is as follows. Begin forming the cathode material solution by adding carbon to water to form a stabilizing agent. Next, potassium hydroxide (KOH) electrolyte is added, such that the carbon is approximately 3% of the KOH to form an electrolyte suspension. A milling apparatus ball mills the electrolyte suspension using mill balls having a mass of approximately half of the electrolyte solution for substantially around 24 hours, and the resulting the electrolyte solution is sonicated for 1 hour. Following milling, a quantity of nickel hydroxide Ni(OH)$_2$ is added to the electrolyte suspension to form a substantially 10% nickel hydroxide suspension. The mill is used to further ball milling the electrolyte solution for substantially around 24 hours, and a pump 146 circulates the electrolyte solution through a voltage cell as a cathode material 122, in which the voltage cell further has anode material 124 and charge plates 142 for connection a voltage load 144.

An alternative suspension may be formed by adding granulated carbon to form a 5% suspension. Therefore, the anode and cathode charge materials are responsive to a flow battery 110 for distributing the charge materials (122, 124) through the voltage cell 140, in which the voltage cell 140 has positive 162 and negative 164 terminals for connection to a load 144, and the anodic 124 and cathodic charge materials 122 are circulated via a respective pump 146-2, 146-1 for maintaining a potential in the voltage cell 140 for powering the load 144.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting, the full scope rather being conveyed by the appended claims.

What is claimed is:

1. A method of generating an electrochemical charge comprising:

combining a cathode material with an electrolyte and a stabilizing agent to form an electrolyte mixture, including combining the stabilizing agent with the electrolyte to form a combination, agitating the combination before adding the cathode material, adding the cathode material and further agitating the combination including the added cathode material for increasing the charge density;

generating a suspension by agitating the electrolyte mixture; and circulating the suspension through a voltage cell, the voltage cell having charge plates responsive to the electrolyte mixture for generating the electrochemical charge, combing further comprising:

adding a stabilizing agent including carbon powder to a water base;

adding an electrolyte based on a suspension property of the electrolyte and the stabilizing agent in the water base;

adding a cathode material to form the suspension; and agitating the suspension for decreasing a particle size of the suspension and increasing a charge density of the suspension.

2. The method of claim 1 wherein the electrolyte is a water-based electrolyte.

3. The method of claim 1 further comprising generating an anode suspension by combining an anode material with the stabilizing agent.

4. The method of claim 3 wherein the anode suspension and the generated suspension including the cathode material are responsive to a flow battery for distributing the cathode and anode materials through the voltage cell, the voltage cell having positive and negative terminals for connection to a load, the anodic and cathode materials circulated via a respective pump for maintaining a potential in the voltage cell for powering the load.

5. The method of claim 4 wherein the flow battery provides charge density greater than 100 watt hours per liter of charge material suspension.

6. The method of claim 1 wherein the stabilizing agent includes polymers for maintaining the charge material in solution.

7. The method of claim 6 wherein agitating further comprises ball milling to increase granularity of the suspension.

8. The method of claim 1 wherein the suspension has a concentration greater than 2 moles/liter of the cathode material.

9. The method of claim 4 wherein the cathode material is nickel hydroxide ($Ni(OH)_2$) and the anode material is zinc oxide (ZnO).

10. The method of claim 1, further comprising varying an amount of suspended cathode material per unit volume for affect the total charge capacity, and
    generating the suspension adapted based on a selection of range or power of an electric vehicle.

11. The method of claim 1, further comprising increasing charge density by increasing a stability of the suspension through reduced particle size by adding dispersants to a ball milled cathode material.

12. A method of generating an electrochemical charge comprising:
    combining a cathode material with an electrolyte and a stabilizing agent to form an electrolyte mixture, including combining the stabilizing agent with the electrolyte to form a combination, agitating the combination before adding the cathode material, adding the cathode material and further agitating, by ball milling, the mixture including the added cathode material for increasing the charge density;
    generating a suspension by agitating the electrolyte mixture; and
    circulating the suspension through a voltage cell, the voltage cell having charge plates responsive to the electrolyte mixture for generating the electrochemical charge,
    wherein combining further comprises:
        adding a stabilizing agent including carbon powder to a water base;
        adding an electrolyte based on a suspension property of the electrolyte and the stabilizing agent in the water base;
        adding a cathode material to form the suspension; and
        agitating the suspension for decreasing a particle size of the suspension and increasing a charge density of the suspension.

\* \* \* \* \*